(12) United States Patent
Bontu et al.

(10) Patent No.: US 11,108,426 B2
(45) Date of Patent: Aug. 31, 2021

(54) METHOD AND APPARATUS FOR HALF-DUPLEX COMMUNICATION

(71) Applicant: TELEFONAKTIEBOLAGET LM ERICSSON (PUBL), Stockholm (SE)

(72) Inventors: Chandra Bontu, Nepean (CA); Prabaharan Kanesalingam, Ottawa (CA); Patrick Lie Chin Cheong, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 67 days.

(21) Appl. No.: 15/736,787

(22) PCT Filed: Jun. 15, 2016

(86) PCT No.: PCT/SE2016/050579
§ 371 (c)(1),
(2) Date: Dec. 15, 2017

(87) PCT Pub. No.: WO2016/204678
PCT Pub. Date: Dec. 22, 2016

(65) Prior Publication Data
US 2018/0183485 A1 Jun. 28, 2018

Related U.S. Application Data

(60) Provisional application No. 62/175,592, filed on Jun. 15, 2015.

(51) Int. Cl.
*H04B 1/44* (2006.01)
*H04W 76/28* (2018.01)
(Continued)

(52) U.S. Cl.
CPC .............. *H04B 1/44* (2013.01); *H04L 5/14* (2013.01); *H04W 56/00* (2013.01); *H04W 76/28* (2018.02)

(58) Field of Classification Search
CPC ............ H04L 5/14; H04W 1/44; H04W 76/28
(Continued)

(56) References Cited

U.S. PATENT DOCUMENTS

2010/0118815 A1* 5/2010 Kim .................. H04W 52/0216
370/329
2010/0278176 A1* 11/2010 Faniuolo ................. H04L 47/35
370/389
(Continued)

FOREIGN PATENT DOCUMENTS

| WO | 2008/137596 A1 | 11/2008 | |
|----|----------------|---------|---|
| WO | 2009/088496 A1 | 7/2009 | |
| WO | WO-2009088496 A1 * | 7/2009 | ............ H04W 76/28 |
| WO | 2013/035984 A1 | 3/2013 | |

OTHER PUBLICATIONS

WO-2009088496-A1 (Year: 2009).*
(Continued)

*Primary Examiner* — Christopher M Crutchfield
*Assistant Examiner* — Jean F Voltaire
(74) *Attorney, Agent, or Firm* — Sage Patent Group

(57) ABSTRACT

A wireless communication device receives an indication of timing alignment of a discontinuous reception (DRX) duration, determines a timing alignment for a reception/transmission (RX/TX) switching pattern of the wireless communication device based on the timing alignment of the DRX duration, and performs half-duplex (HD) communication with a radio access node according to the RX/TX switching pattern having the determined timing alignment.

16 Claims, 15 Drawing Sheets

(51) Int. Cl.
*H04W 56/00* (2009.01)
*H04L 5/14* (2006.01)

(58) Field of Classification Search
USPC .......................................................... 370/277
See application file for complete search history.

(56) References Cited

U.S. PATENT DOCUMENTS

| | | | | |
|---|---|---|---|---|
| 2011/0292854 | A1* | 12/2011 | Terry | H04L 5/001 370/311 |
| 2012/0051255 | A1* | 3/2012 | Han | H04W 24/10 370/252 |
| 2012/0082140 | A1* | 4/2012 | Lin | H04W 74/085 370/336 |
| 2015/0271746 | A1* | 9/2015 | Jang | H04W 4/70 370/329 |
| 2017/0013557 | A1* | 1/2017 | Koc | H04W 36/03 |

OTHER PUBLICATIONS

International Search report dated Sep. 13, 2016, for International Application No. PCT/SE2016/050579, International Filing Date: Jun. 15, 2016, consisting of 4 pages.
Written Opinion dated Sep. 13 2016, for International Application No. PCT/SE2016/050579, International Filing Date: Jun. 15, 2016, consisting of 6 pages.
3rd Generation Partnership Project; Technical Specification Group Radio Access Network; Evolved Universal Terrestrial Radio Access (E-UTRA); Radio Resource Control (RRC); Protocol specification (Release 12), 3GPP TS 36.331 V12.4.1 (Dec. 2014).
3rd Generation Partnership Project; Technical Specification Group Radio Access Network; Study on provision of low-cost Machine-Type Communications (MTC) User Equipment (UEs) based on LTE (Release 12), 3GPP TR 36.888 V12.0.0 (Jun. 2013).
3rd Generation Partnership Project; Technical Specification Group Radio Access Network; Evolved Universal Terrestrial Radio Access (E-UTRA); Physical channels and modulation (Release 12), 3GPP TS 36.211 V12.4.0 (Dec. 2014), section 5.7.2.
3rd Generation Partnership Project; Technical Specification Group Radio Access Network; Evolved Universal Terrestrial Radio Access Network (E-UTRAN); X2 application protocol (X2AP) (Release 12), 3GPP TS 36.423 V12.5.0 (Mar. 2015).
Examination Report for European Patent Application No. 16732793.1, dated Jul. 11, 2019, 6 pages.
Office Action issued in corresponding EP Application No. 16732793.1 dated Sep. 20, 2018, 03 Pages.
Office Action issued in corresponding EP Application No. 16732793.1 dated Jul. 11, 2019, 06 Pages.

* cited by examiner

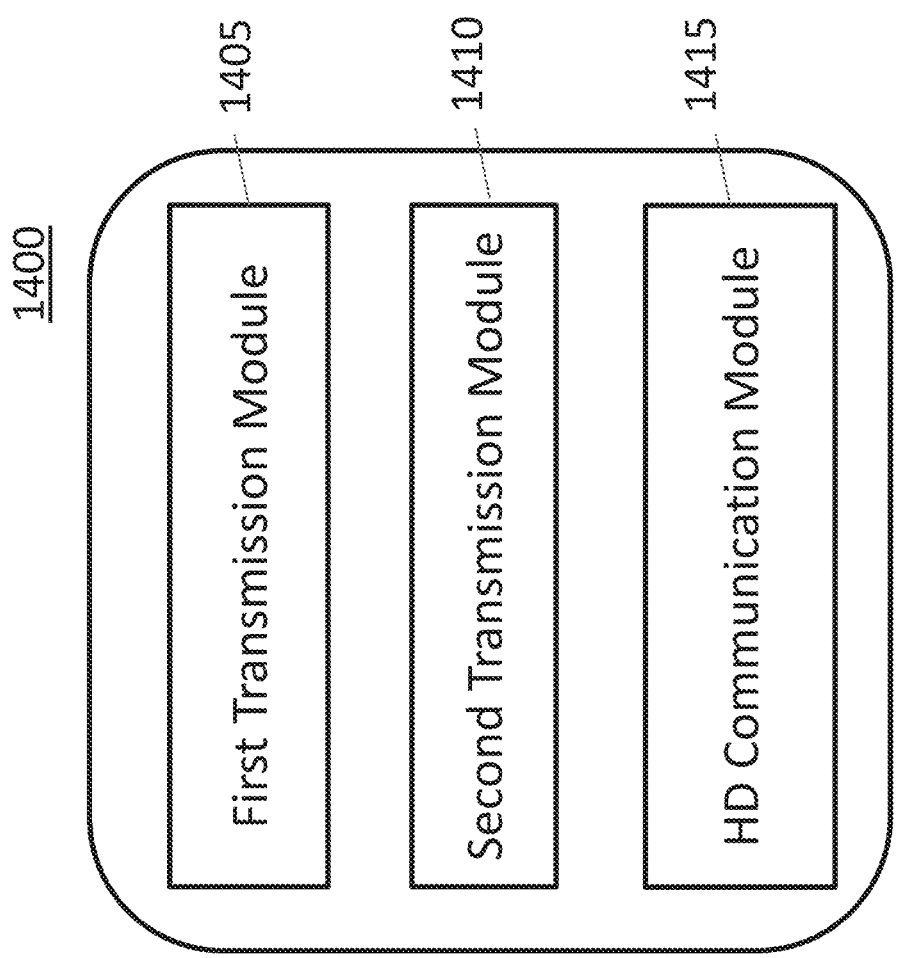

METHOD AND APPARATUS FOR HALF-DUPLEX COMMUNICATION

CROSS-REFERENCE TO RELATED APPLICATION

This application claims the benefit of U.S. Provisional Patent Application No. 62/175,592 filed on Jun. 15, 2015, the subject matter of which is hereby incorporated by reference.

TECHNICAL FIELD

The disclosed subject matter relates generally to telecommunications and more particularly to methods and apparatuses for half-duplex communication.

BACKGROUND

A duplex communication system is one that supports point-to-point communication between two parties in both directions. In a full-duplex (FD) communication system, the communication may occur in both directions at the same time, and in a half-duplex (HD) communication system, the communication may occur in only one direction at a time.

FD and HD operations are typically implemented using either time-division duplexing (TDD) or frequency division duplexing (FDD). In TDD, outward and return signals are communicated on the same carrier frequency, but at different times (e.g., in different time slots or non-overlapping subframes). In FDD, outward and return signals are communicated on different carrier frequencies, and can be communicated at the same or different times. In full-duplex FDD (FD-FDD) outward and return signals are communicated at the same time, and in half-duplex FDD (HD-FDD), outward and return signals are communicated at different times.

Certain communication standards such as Long-Term Evolution (LTE) provide for both TDD and FDD modes of communication, with the FDD mode being either an FD-FDD mode or an HD-FDD mode. The HD-FDD mode has the potential benefit, under certain frequency arrangements, of being implemented without a duplex filter. For instance, a device implementing HD-FDD may use a switch to change between different frequency channels rather than using a duplex filter to maintain concurrent communication on two different frequency channels. The omission of a duplex filter may allow such a device to be implemented at relatively lower cost and with lower power consumption compared to devices that require a duplex filter. Accordingly, the use of HD-FDD may be particularly attractive for certain low-cost applications. The HD-FDD mode also has the potential benefit of allowing FDD frequency bands that could not otherwise be used due to too narrow of a duplex distance. In the case of TDD, HD operation can augment the UL-DL transitions defined by the TDD configuration set up further based on the UE capabilities. Based on a UE capability, the cell specific DL-UL configuration, which is set by selecting a TDD configuration, can be further tuned by employing the HD operation. For example, the UE need not decode the received signal for data or search for the UL grants during all the configured DL subframes.

Some envisioned uses of the HD-FDD mode include various forms of machine type communication (MTC). MTC communication generally involves communication between machines and other machines (e.g., machine-to-machine communication) and/or between machines and humans. Such communication may include, for example, the exchange of measurement data, control signals, and configuration information. The machines involved in MTC may be of various forms and sizes, ranging from wallet-sized devices to base stations, for example. An example low-cost application of MTC is telemetry, e.g., remote temperature sensing, meter reading, and so on. In many such applications, MTC devices are deployed in large numbers, with each device operating in infrequent bursts. Accordingly, it may be beneficial to reduce the cost and/or power consumption of each device by omitting a duplex circuit and relying on HD-FDD communication.

In certain contexts, such as LTE based systems, HD-FDD communication may occur between one or more devices that support HD-FDD but not FD-FDD communication (hereafter, an "HD-FDD device"), and one or more other devices that support both HD-FDD and FD-FDD communication (hereafter, an "FD-FDD device"). In such contexts, a scheduler in an FD-FDD device (e.g., an eNodeB) may be required to consider data and control traffic in both directions when making scheduling decisions for an HD-FDD device (e.g., a low-cost MTC device). This requirement tends to add complexity to the scheduler. For example, when not in discontinuous receive mode (DRX), the HD-FDD device may continuously receive information through downlink physical channels except when instructed by the network to transmit in the uplink or when transmitting data or control signals (e.g., scheduling requests or synchronization reference signals or ACK/NACK/channel state information (CSI) feedback signals) through the physical UL control channel (PUCCH) or the physical random access channel (PRACH) on an unscheduled basis (e.g., contention-based).

BRIEF DESCRIPTION OF THE DRAWINGS

The drawings illustrate selected embodiments of the disclosed subject matter. In the drawings, like reference labels denote like features.

FIG. 14 illustrates a radio access node according to an embodiment of the disclosed subject matter.

SUMMARY

Figure 1:
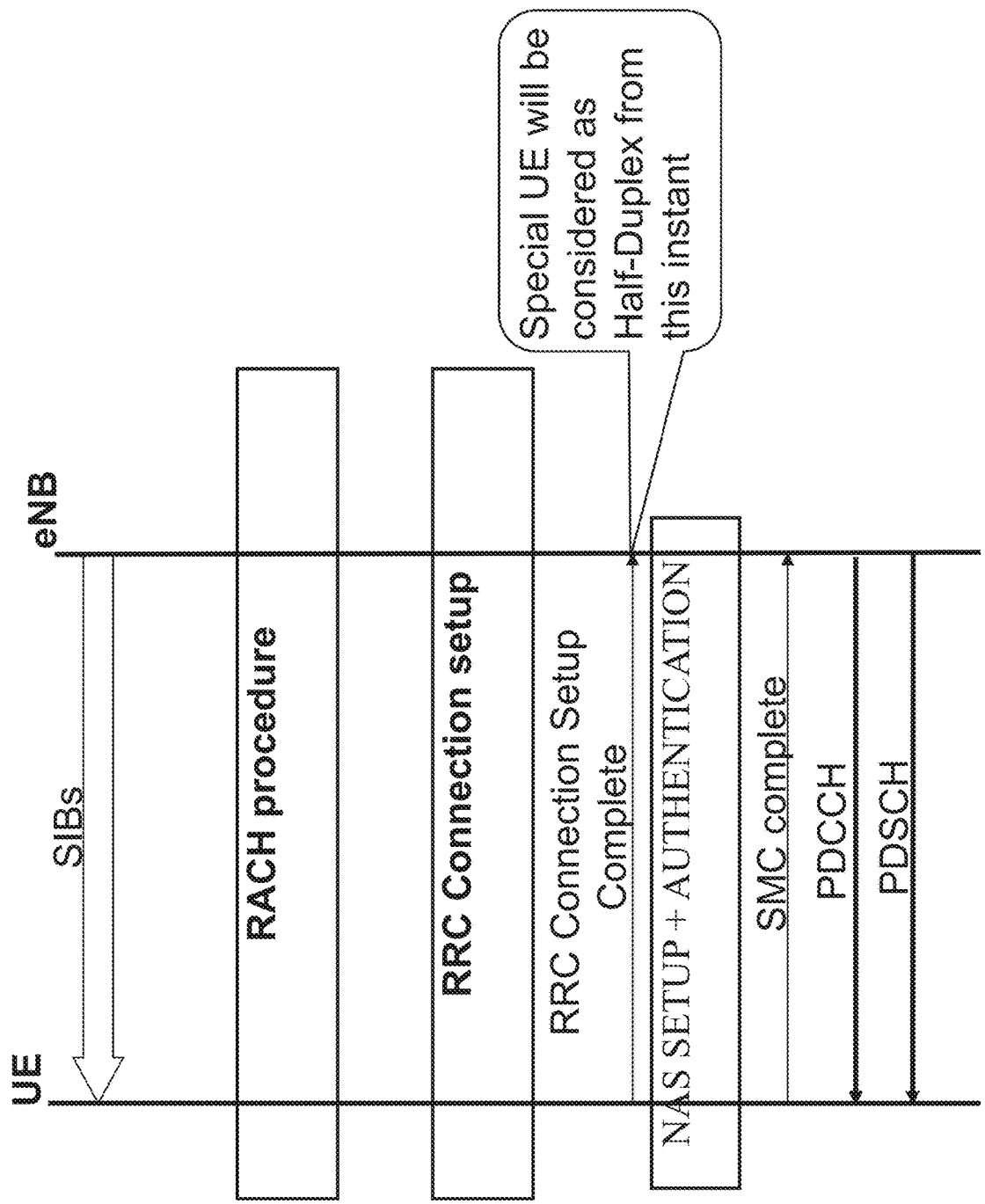
FIG. 1 illustrates half-duplex UE operation after network registration in accordance with an embodiment of the disclosed subject matter.

In some embodiments of the disclosed subject matter, a method of operating a wireless communication device comprising receiving an indication of timing alignment of a discontinuous reception (DRX) duration, determining a timing alignment for a reception/transmission (RX/TX) switching pattern of the wireless communication device based on the timing alignment of the DRX duration, and performing HD communication with a radio access node according to the RX/TX switching pattern having the determined timing alignment.

In certain related embodiments, the indication of the timing alignment for the DRX duration comprises an indication of a start time of the DRX duration. In some such embodiments, the DRX duration is a DRX ON duration. Determining the timing alignment for the RX/TX switching pattern may comprise e.g. identifying a start time for a state of the RX/TX switching pattern as having a predetermined offset relative to the start time of the DRX duration. The state of the RX/TX switching pattern may comprise e.g. a receive state, a transmit state, or a transition state.

In certain related embodiments, method further comprises receiving an indication during an RX window of the RX/TX switching pattern to extend the RX window. The indication may be contained in a MAC CE indicating a number of subframes by which the RX window is to be extended. The indication may be e.g. an LCID value in the MAC CE.

In certain related embodiments, the method further comprises receiving information identifying multiple candidate RX/TX switching patterns that may be used by the wireless communication device; selecting one of the multiple candidate RX/TX switching patterns as a preferred RX/TX switching pattern; and transmitting an indication of the preferred RX/TX switching pattern to the radio access node. The indication of the preferred RX/TX switching pattern may be e.g. an LCD value included in a random access message 3 (Msg3).

In certain related embodiments, the DRX duration is a DRX ON duration and the method further comprises: determining whether the wireless communication device receives a PDCCH communication during the DRX ON duration, and in response to determining that the wireless communication device does not receive the PDCCH communication during the DRX ON duration, switching the wireless communication device to a DRX OFF state. In some such embodiments, the method further comprises, in response to determining that the wireless communication device does not receive the PDCCH communication during the DRX ON duration, further determining whether the wireless communication device is engaged in an ongoing downlink or uplink transmission, and in response to determining that the wireless communication device is engaged in an ongoing downlink or uplink transmission, extending an RX or TX window of the RX/TX switching pattern.

In some embodiments of the disclosed subject matter, a method of operating a radio access node comprises transmitting an indication of timing alignment of a DRX duration, transmitting an indication of a DRX offset that, in combination with the timing alignment of the DRX duration, defines a timing alignment for a reception/transmission (RX/TX) switching pattern of a wireless communication device, and performing half-duplex (HD) communication with the wireless communication device according to the RX/TX switching pattern having the determined timing alignment.

In certain related embodiments, the indication of the timing alignment for the DRX duration comprises an indication of a start time of the DRX duration. In some such embodiments, the DRX duration is a DRX ON duration. The timing alignment for the RX/TX switching pattern may comprise e.g. a start time for a state of the RX/TX switching pattern having a predetermined offset relative to the start time of the DRX duration, and wherein the state of the RX/TX switching pattern comprises a receive state, a transmit state, or a transition state.

In certain related embodiments, the method further comprises transmitting an indication during an RX window of the RX/TX switching pattern to extend the RX window. In some such embodiments, the indication is contained in a MAC CE indicating a number of subframes by which the RX window is to be extended. The indication may be e.g. an LCD value in the MAC CE.

In certain related embodiments, the method further comprises detecting unsuccessful reception of a packet containing the MAC CE with an RX window extension at the UE, by monitoring uplink (UL) transmission by the UE in a default UL transmission window; and in response to detecting the unsuccessful reception of the packet, stopping transmission of packets to the UE until a next default downlink (DL) transmission opportunity.

In certain related embodiments, the method further comprises transmitting information identifying multiple candidate RX/TX switching patterns that may be used by the wireless communication device; and receiving from the wireless communication device an indication of one of the multiple candidate RX/TX switching patterns as a preferred RX/TX switching pattern. In some such embodiments, the indication of the preferred RX/TX switching pattern is a logical channel identifier (LCID) value included in a random access message 3 (Msg3).

In some embodiments of the disclosed subject matter, a wireless communication device comprises a receiver configured to receive an indication of timing alignment of a discontinuous reception (DRX) duration, and at least one processor configured to determine a timing alignment for a reception/transmission (RX/TX) switching pattern of the wireless communication device based on the timing alignment of the DRX duration, and further configured to control half-duplex (HD) communication with a radio access node according to the RX/TX switching pattern having the determined timing alignment.

In certain related embodiments, the indication of the timing alignment for the DRX duration comprises an indication of a start time of the DRX duration. In some such embodiments, the DRX duration is a DRX ON duration. Determining the timing alignment for the RX/TX switching pattern may comprise e.g. identifying a start time for a state of the RX/TX switching pattern as having a predetermined offset relative to the start time of the DRX duration. The state of the RX/TX switching pattern may comprise e.g. a receive state, a transmit state, or a transition state.

In certain related embodiments, the receiver is further configured to receive an indication during an RX window of the RX/TX switching pattern to extend the RX window. In some such embodiments, the indication is contained in a MAC CE indicating a number of subframes by which the RX window is to be extended. The indication may be e.g. an LCD value in the MAC CE.

In certain related embodiments, the receiver is further configured to receive information identifying multiple candidate RX/TX switching patterns that may be used by the wireless communication device, and wherein the at least one processor is further configured to select one of the multiple candidate RX/TX switching patterns as a preferred RX/TX switching pattern, the wireless communication device further comprising: a transmitter configured to transmit an indication of the preferred RX/TX switching pattern to the radio access node.

In certain related embodiments, the indication of the preferred RX/TX switching pattern is a logical channel identifier (LCD) value included in a random access message 3 (Msg3).

In certain related embodiments, the DRX duration is a DRX ON duration and the at least one processor is further configured to determine whether the wireless communication device receives a physical downlink control channel (PDCCH) communication during the DRX ON duration, and in response to determining that the wireless communication device does not receive the PDCCH communication during the DRX ON duration, switch the wireless communication device to a DRX OFF state. In some such embodiments, the at least one processor is further configured to, in response to determining that the wireless communication device does not receive the PDCCH communication during the DRX ON duration, further determine whether the wireless communication device is engaged in an ongoing downlink or uplink transmission; and in response to determining that the wireless communication device is engaged in an ongoing downlink or uplink transmission, extend an RX or TX window of the RX/TX switching pattern.

In some embodiments of the disclosed subject matter, a radio access node comprises a transmitter configured to transmit an indication of timing alignment of a discontinuous reception (DRX) duration, further configured to transmit an indication of a DRX offset that, in combination with the timing alignment of the DRX duration, defines a timing alignment for a reception/transmission (RX/TX) switching pattern of a wireless communication device. The radio access node further comprises at least one processor configured to control half-duplex (HD) communication with the wireless communication device according to the RX/TX switching pattern having the determined timing alignment.

In certain related embodiments, the indication of the timing alignment for the DRX duration comprises an indication of a start time of the DRX duration. In some such embodiments, the DRX duration is a DRX ON duration. The timing alignment for the RX/TX switching pattern may comprise e.g. a start time for a state of the RX/TX switching pattern having a predetermined offset relative to the start time of the DRX duration, and wherein the state of the RX/TX switching pattern comprises a receive state, a transmit state, or a transition state. The transmitter may be further configured to transmit an indication during an RX window of the RX/TX switching pattern to extend the RX window. The indication may be contained in a MAC CE indicating a number of subframes by which the RX window is to be extended. The indication may be e.g. a logical channel identifier (LCD) value in the MAC CE. The at least one processor may be further configured to detect unsuccessful reception of a packet containing the MAC CE with an RX window extension at the UE, by monitoring uplink (UL) transmission by the UE in a default UL transmission window, and in response to detecting the unsuccessful reception of the packet, stop transmission of packets to the UE until a next default downlink (DL) transmission opportunity.

In certain related embodiments, the transmitter is further configured to transmit information identifying multiple candidate RX/TX switching patterns that may be used by the wireless communication device, and the radio access node further comprises a receiver configured to receive from the wireless communication device an indication of one of the multiple candidate RX/TX switching patterns as a preferred RX/TX switching pattern. In some such embodiments, the indication of the preferred RX/TX switching pattern is a logical channel identifier (LCD) value included in a random access message 3 (Msg3).

In some embodiments of the disclosed subject matter, a wireless communication device comprises a receiving module configured to receive an indication of timing alignment of a DRX duration, a determining module configured to determine a timing alignment for an RX/TX switching pattern of the wireless communication device based on the timing alignment of the DRX duration, and an HD communication module configured to perform HD communication with a radio access node according to the RX/TX switching pattern having the determined timing alignment.

In certain related embodiments, the indication of the timing alignment for the DRX duration comprises an indication of a start time of the DRX duration. The DRX duration may be e.g. a DRX ON duration. The determining the timing alignment for the RX/TX switching pattern may comprise e.g. identifying a start time for a state of the RX/TX switching pattern as having a predetermined offset relative to the start time of the DRX duration. The state of the RX/TX switching pattern may comprise e.g. a receive state, a transmit state, or a transition state.

In certain related embodiments, the wireless communication device further comprises a second receiving module configured to receive an indication during an RX window of the RX/TX switching pattern to extend the RX window. The indication may be contained in e.g. a MAC CE indicating a number of subframes by which the RX window is to be extended. The indication may be e.g. an LCID value in the MAC CE.

In certain related embodiments, the wireless communication device further comprises a second receiving module configured to receive information identifying multiple candidate RX/TX switching patterns that may be used by the wireless communication device, a selecting module configured to select one of the multiple candidate RX/TX switching patterns as a preferred RX/TX switching pattern, and a transmission module configured to transmit an indication of the preferred RX/TX switching pattern to the radio access node. The indication of the preferred RX/TX switching pattern may be e.g. an LCID value included in a random access message 3 (Msg3).

In certain related embodiments, the DRX duration is a DRX ON duration and the wireless communication device further comprises a second determining module configured to determine whether the wireless communication device receives a physical downlink control channel (PDCCH) communication during the DRX ON duration, and a switching module configured to, in response to determining that the wireless communication device does not receive the PDCCH communication during the DRX ON duration, switch the wireless communication device to a DRX OFF state. In some such embodiments, the wireless communication device may further comprise a second determining module configured to, in response to determining that the wireless communication device does not receive the PDCCH communication during the DRX ON duration, further determine whether the wireless communication device is engaged in an ongoing downlink or uplink transmission, and an extending module configured to, in response to determining that the wireless communication device is engaged in an ongoing downlink or uplink transmission, extend an RX or TX window of the RX/TX switching pattern.

In some embodiments of the disclosed subject matter, a radio access node comprises a first transmission module configured to transmit an indication of timing alignment of a DRX duration, a second transmission module configured to transmit an indication of a DRX offset that, in combination with the timing alignment of the DRX duration, defines a timing alignment for a reception/transmission (RX/TX) switching pattern of a wireless communication device, and an HD communication module configured to perform HD communication with the wireless communication device according to the RX/TX switching pattern having the determined timing alignment.

In certain related embodiments, the indication of the timing alignment for the DRX duration comprises an indication of a start time of the DRX duration. The DRX duration may be e.g. a DRX ON duration. The timing alignment for the RX/TX switching pattern may comprise e.g. a start time for a state of the RX/TX switching pattern having a predetermined offset relative to the start time of the DRX duration, and wherein the state of the RX/TX switching pattern comprises a receive state, a transmit state, or a transition state.

In certain related embodiments, radio access node 1400 further comprises a third transmission module configured to transmit an indication during an RX window of the RX/TX switching pattern to extend the RX window. The indication may be contained in e.g. a MAC CE indicating a number of subframes by which the RX window is to be extended. The indication may be e.g. an LCID value in the MAC CE. The radio access node may further comprise a detection module configured to detect unsuccessful reception of a packet containing the MAC CE with an RX window extension by the UE, by monitoring UL transmission by the UE in a default UL transmission window, and a transmission stopping module configured to, in response to detecting the unsuccessful reception of the packet, stop transmission of packets to the UE until a next default DL transmission opportunity.

In certain related embodiments, the radio access node further comprises a third transmission module configured to transmit information identifying multiple candidate RX/TX switching patterns that may be used by the wireless communication device, and a receiving module configured to receive from the wireless communication device an indication of one of the multiple candidate RX/TX switching patterns as a preferred RX/TX switching pattern. The indication of the preferred RX/TX switching pattern may be e.g. an LCID value included in a random access message 3 (Msg3).

DETAILED DESCRIPTION

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

In the description that follows, terms such as "terminal", "UE" and "wireless communication device" may be used interchangeably. Terms such as "radio access node" "eNodeB" and "base station" may also be used interchangeably. Terms such as "TX/RX state transition pattern", "half-duplex pattern", and "half-duplex switching pattern" may also be used interchangeably.

Communication between an HD-FDD terminal and a wireless network assumes that both the wireless network and the half-duplex FDD terminal have a common understanding about the timing of the terminal's transmit states. Such understanding may help achieve successful transmission of data packets from the wireless network to the terminal without collision with uplink (UL) transmission originated by the terminal.

After successful radio resource control (RRC) connection establishment with a network, a UE may start half-duplex operation following transmission/reception (TX/RX) state transition pattern. However, the timing to start the state transitions should be synchronized between the UE and the network.

One method of synchronizing the states between the UE and the network is by initiating a handshake mechanism. However, due to an unpredictable delay experienced by the wireless medium used for communication between the UE and the network, synchronization of the network and the UE is difficult. Another method of synchronizing the states between the UE and the network is to exchange a system frame number to which one of the states are started. Both of these methods require additional signaling to commence half-duplex operation, which often results in additional delay. The TX states during which the UE has predefined opportunities to request UL grant may be predefined in a standard specification. Thus, there is a need to address these issues with the aforementioned methods. Specifically, there is a need to commence half-duplex operation without requiring any additional parameters or signaling.

In certain embodiments described below, a network and a UE assume that the start of a UE's RX state is aligned with respect to a fixed offset from the start of a DRX ON duration (longDRX-CycleStartOffset). The DRX parameters may be provided to the UE by the network during RRC connection setup. TX states during which the UE has predefined opportunities to request UL grant may be predefined in a standard specification. Moreover, in certain embodiments a broadcast message is used to signal a TX/RX state transition pattern, and in certain embodiments a UE uses a MAC or RRC mechanism to notify the network of UE's preferred pattern.

FIG. 1 illustrates half-duplex UE operation after network registration in accordance with an embodiment of the disclosed subject matter.

Referring to FIG. 1, when connecting to a network, the UE reads system information blocks (SIBs) broadcasted by the network. The network also includes information about radio communication access parameters, such as, for example, a set of random access channel (RACH) preambles in the SIBs.

The UE performs RACH procedure by randomly selecting a RACH preamble from the set, and thereafter performs RRC connection setup. During RRC connection setup, the UE operates in half-duplex mode. For example, the UE sends a message to the network and then listens for a response from the network. RRC connection setup is considered to be completed successfully when the network receives a "RRC connection setup complete" message from the UE. At this point, the UE can request UL resources from the network by sending a scheduling request. However, the UE and network should have a common understanding about the UE's availability to listen to the downlink transmission (i.e. RX state) and to transmit requests or data to the network (i.e. TX state).

The network and the UE can assume that the start of the UE's RX state can be aligned with respect to a fixed time offset from the start of a discontinuous reception (DRX) ON duration. The DRX parameters are provided to the UE by the network during the RRC connection setup.

Figure 2:
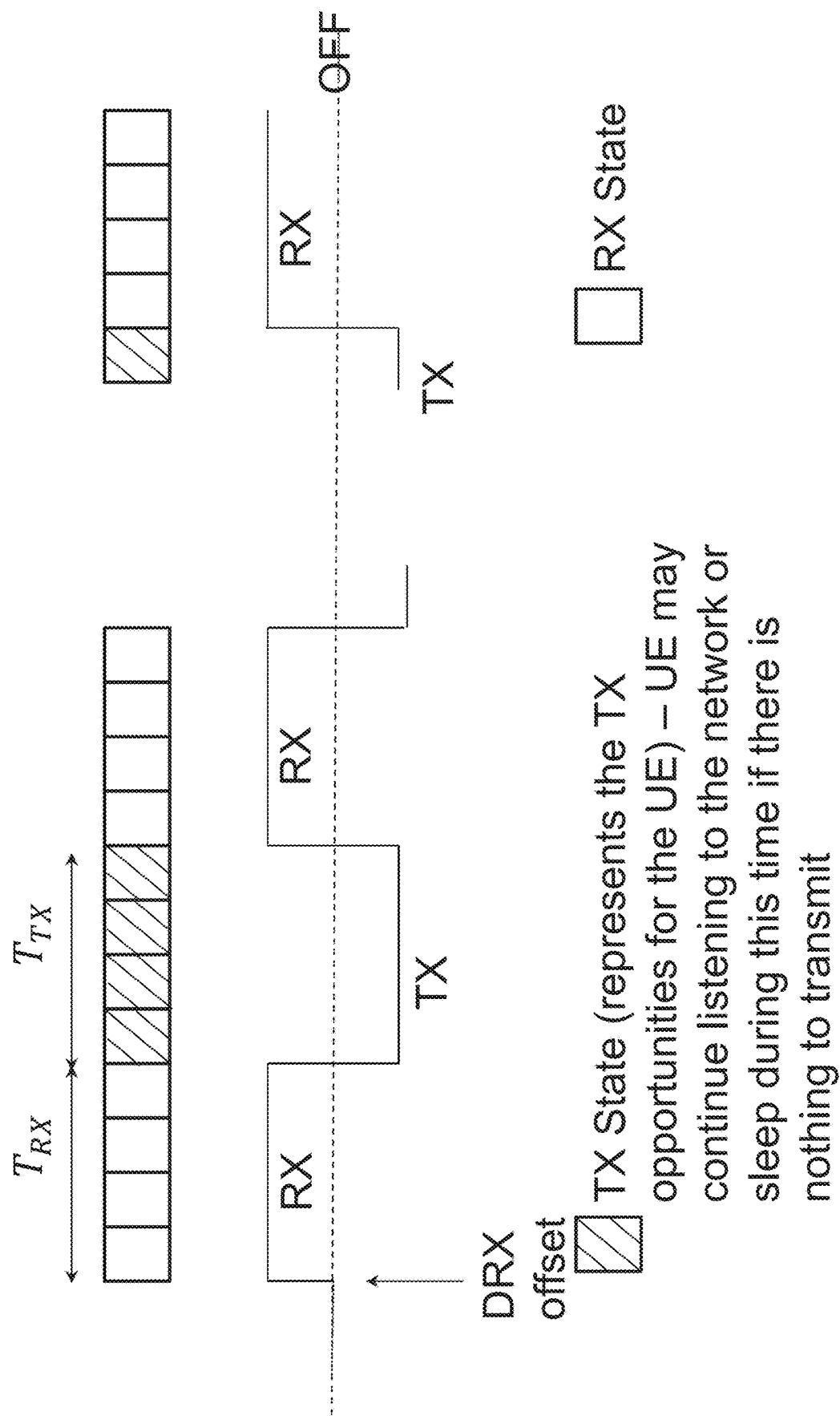
FIG. 2 illustrates state transitions of a half-duplex UE in accordance with an embodiment of the disclosed subject matter.

FIG. 2 illustrates state transitions of a half-duplex UE in accordance with an embodiment of the disclosed subject matter.

Referring to FIG. 2, a UE operates in half-duplex mode by switching between receive states RX of duration $T_{RX}$ and transmit states TX of duration $T_{TX}$. An RX state of the UE begins at a DRX offset, which is defined in relation to a start of a DRX ON duration. A potential benefit of this approach is that no additional parameters need to be exchanged between the network and the UE in order to define the start of the RX state. The duration of the RX and TX states can be pre-defined in standard specifications or exchanged during the RRC connection setup. In the example of FIG. 2, the TX and RX states are set to four subframes, each represented by a box. In addition to the TX and RX states, optional guard time may also be configured between the TX-to-RX and RX-to-TX states to facilitate the state transition at the UE.

Figure 3:
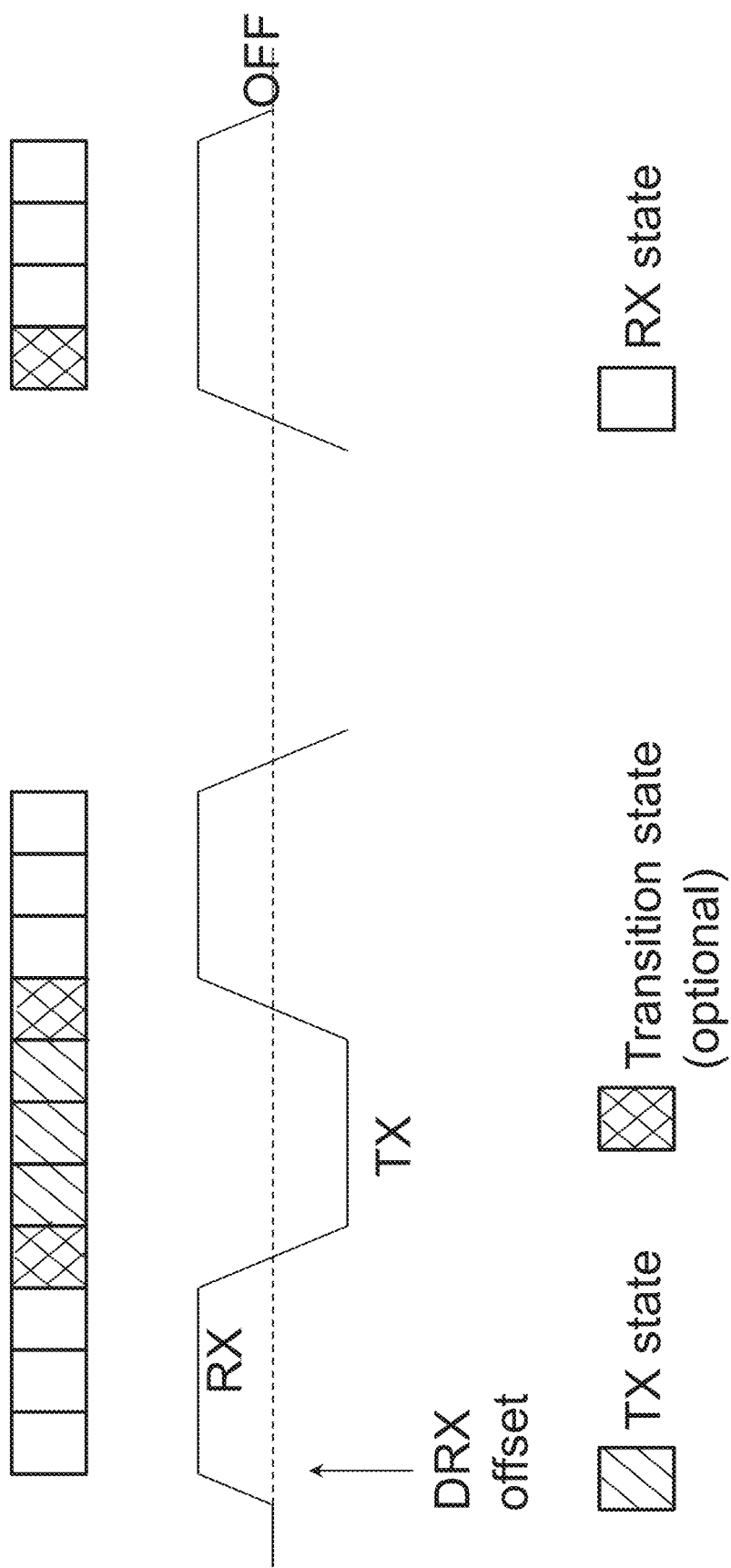
FIG. 3 illustrates additional state transitions of a half-duplex UE in accordance with an embodiment of the disclosed subject matter.

FIG. 3 illustrates additional state transitions of a half-duplex UE in accordance with an embodiment of the disclosed subject matter. Such state transitions include a guard time, or transition state, as discussed above.

Referring to FIG. 3, an RX state of a UE begins at a DRX offset. Thereafter, the UE switches between the RX state and a TX state, with a transition state occurring between the RX and TX states.

Where a UE does not receive Physical Downlink Control Channel (PDCCH) during the RX state, the UE may return to a DRX-OFF state if there are no scheduling requests required to be sent for requesting future UL transmissions. Thereafter, a new DRX offset may be established in relation to a subsequent DRX ON duration.

Figure 4:
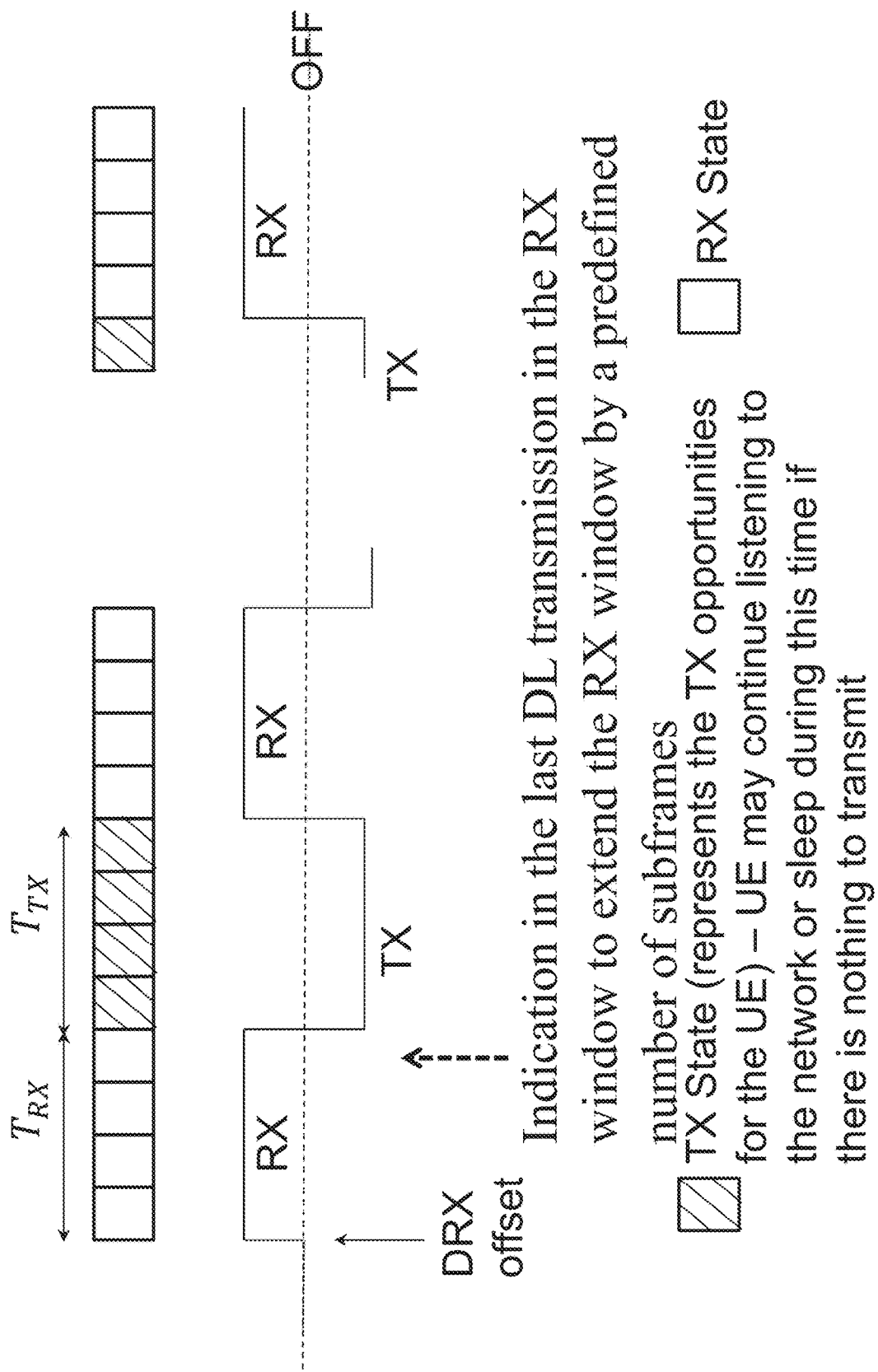
FIG. 4 illustrates an extension of an RX state of a half-duplex UE in accordance with an embodiment of the disclosed subject matter.
Figure 5A:
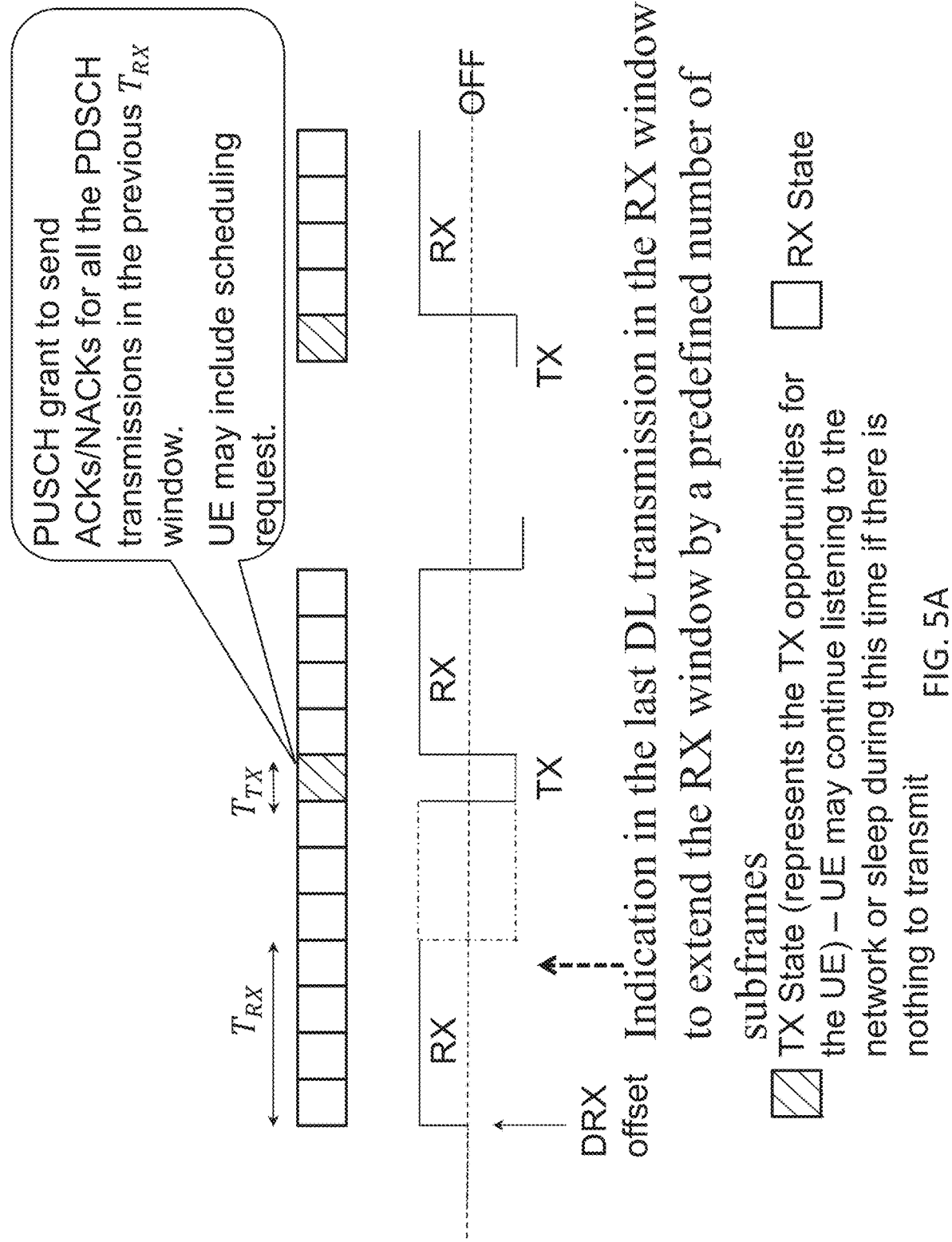
FIG. 5A illustrates adaptive packet receive status feedback for a half-duplex UE in accordance with an embodiment of the disclosed subject matter.
Figure 5B:
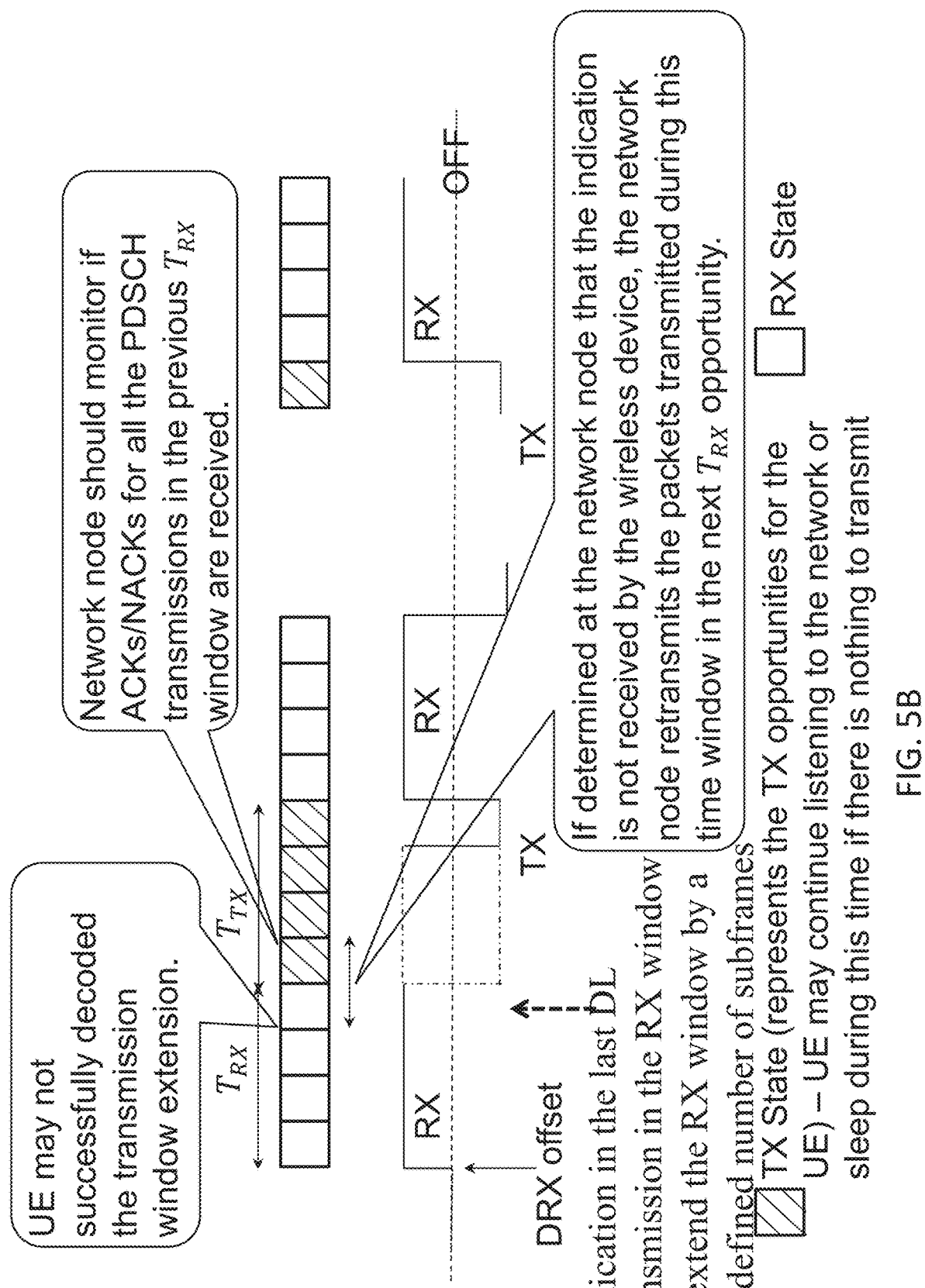
FIG. 5B further illustrates adaptive packet receive status feedback for a half-duplex UE in accordance with an embodiment of the disclosed subject matter.

FIGS. 4 and 5 illustrate an extension of an RX state of a half-duplex UE in accordance with an embodiment of the disclosed subject matter. FIGS. 5A and 5B also illustrate adaptive packet receive status feedback for a half-duplex UE in accordance with an embodiment of the disclosed subject matter.

Referring to FIGS. 4 and 5, the network can extend the duration of the DL transmission by including a Media Access Control (MAC) Control Element (CE) in the in the PDSCH transmitted in the last subframe of the RX window (i.e. within a subframe before the start of TX or RX-to-TX transition window). Such transmission may occur, for instance, at a time indicated by a dotted arrow in FIGS. 4 and 5. This will be an indication to the UE not to switch to TX state. The new MAC CE to extend the DL transmission includes a field to indicate the number of subframes by which a DL transmission period is extended. The number of subframes that the DL transmission can be extend is limited to (the number subframes of TX state–1), as illustrated e.g. in FIG. 5. In a last subframe of the TX state, the UE expects a grant for PUSCH or PUCCH for sending the ACK/NACK status feedback for the packets transmitted in the regular DL transmission window and the extended DL transmission window.

Referring to FIG. 5A, at least one subframe is left in the TX window to facilitate the DL packet receive status feedback (i.e. ACK/NACK). Alternatively the minimum number of TX subframes can be specified in the standard specification.

Referring to FIG. 5B, when the packet containing the MAC CE with RX window extension is not successfully recovered by the UE, the UE may start sending the packet receive status during the next subframe. The network node can easily identify this situation by monitoring the UL feedback on a Physical Uplink Control Channel (PUCCH) pre-assigned to the UE. In this scenario, the radio access node will suspend all the scheduled DL transmissions until the next RX opportunity. Further, the packets transmitted in the last TTI of the last RX opportunity (i.e., the TTI in which the RX window extension has been transmitted) and the following TTI (i.e., the first TTI of the default TX window) are scheduled to be transmitted during the next RX opportunity. In this example, the ack/nack feedback from the UE (either via PUCCH or PUSCH) is scheduled to be in the first TTI of the TX window.

This recovering mechanism will make sure that the packets transmitted in the default TX window are not lost (except for the last packet transmitted in the last subframe of the RX window, carrying the MAC CE for extending the RX window).

The RX MAC control element is identified by MAC Protocol Data Unit (PDU) subheader with Logical Channel Identity (LCID) as specified in the following Table 1.

TABLE 1

| Index | LCID values |
|---|---|
| 00000 | CCCH |
| 00001-01010 | Identity of the logical channel |
| 01011-11000 | Reserved |
| 11001 | RX State Extension (Half-Duplex) |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Figure 6:
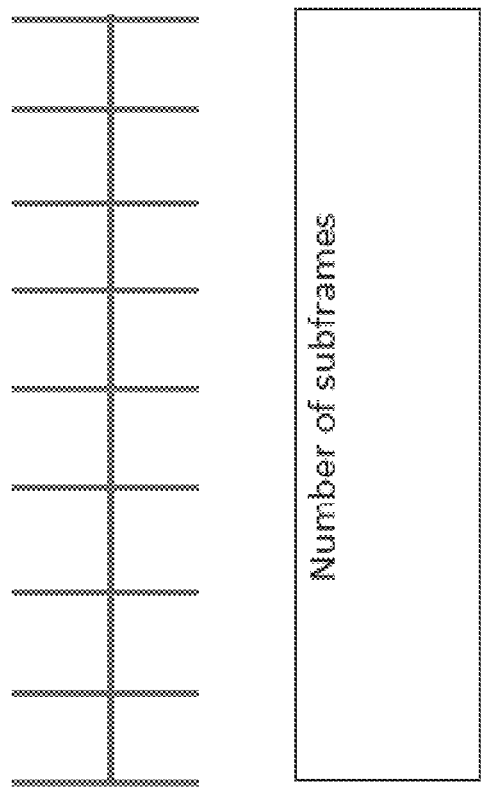
FIG. 6 illustrates a MAC CE for RX state extension in accordance with an embodiment of the disclosed subject matter.

FIG. 6 illustrates a MAC CE for RX state extension in accordance with an embodiment of the disclosed subject matter.

Referring to FIG. 6, the RX MAC control element has a fixed size and includes a single field. The field includes the number of subframes by which DL transmissions to the UE are extending. In this example, the length of the field is 8 bits.

Figure 7:
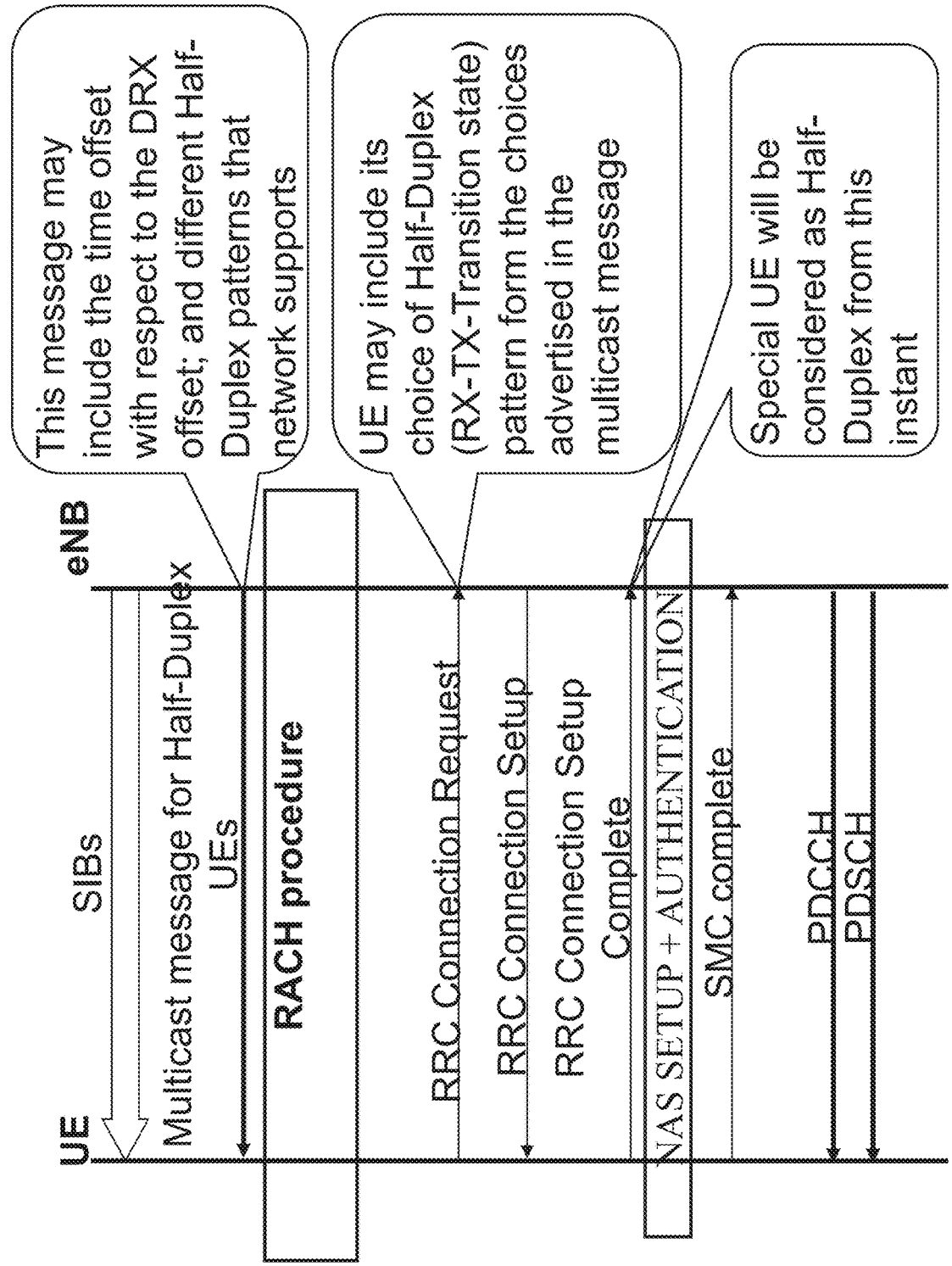
FIG. 7 illustrates signaling to setup/negotiate half-duplex TX-RX state pattern between a network and a UE in accordance with an embodiment of the disclosed subject matter.

FIG. 7 illustrates signaling to setup/negotiate half-duplex TX-RX state pattern between a network and a UE in accordance with an embodiment of the disclosed subject matter.

Referring to FIG. 7, the network node transmits a multicast message to all half-duplex capable UEs advertising different choices of half-duplex patterns and a time offset of RX state (or TX state/transition state) with respect to the DRX offset parameter. The half-duplex patterns can be predefined in standard specifications or between the network and UE vendors, for example. Indices of these patterns are typically advertised in the multicast message. For example different half-duplex patterns can be mapped to different LCIDs.

The half-duplex pattern may have different duty cycles, i.e. ratio of DL to UL time duration ratio. DRX ON duration can be different from the length of the RX state. When a half-duplex UE doesn't receive PDCCH during DRX ON duration, UE may go back to a DRX OFF state. However when there is an ongoing uplink or downlink transmission, UE will extend the TX or RX state beyond the DRX ON duration through the DRX Inactivity timer. UE selects one of the half-duplex patterns and the selected choice is indicated in the msg3. This indication can be via a MAC control element or an IE in the RRC message. Network node may overwrite the UE selection by sending different choice of half-duplex pattern in the RRC connection setup message.

The described embodiments may be implemented in any appropriate type of communication system supporting any suitable communication standards and using any suitable components. As one example, certain embodiments may be implemented in an LTE network, such as that illustrated in FIG. 8.

Figure 8:
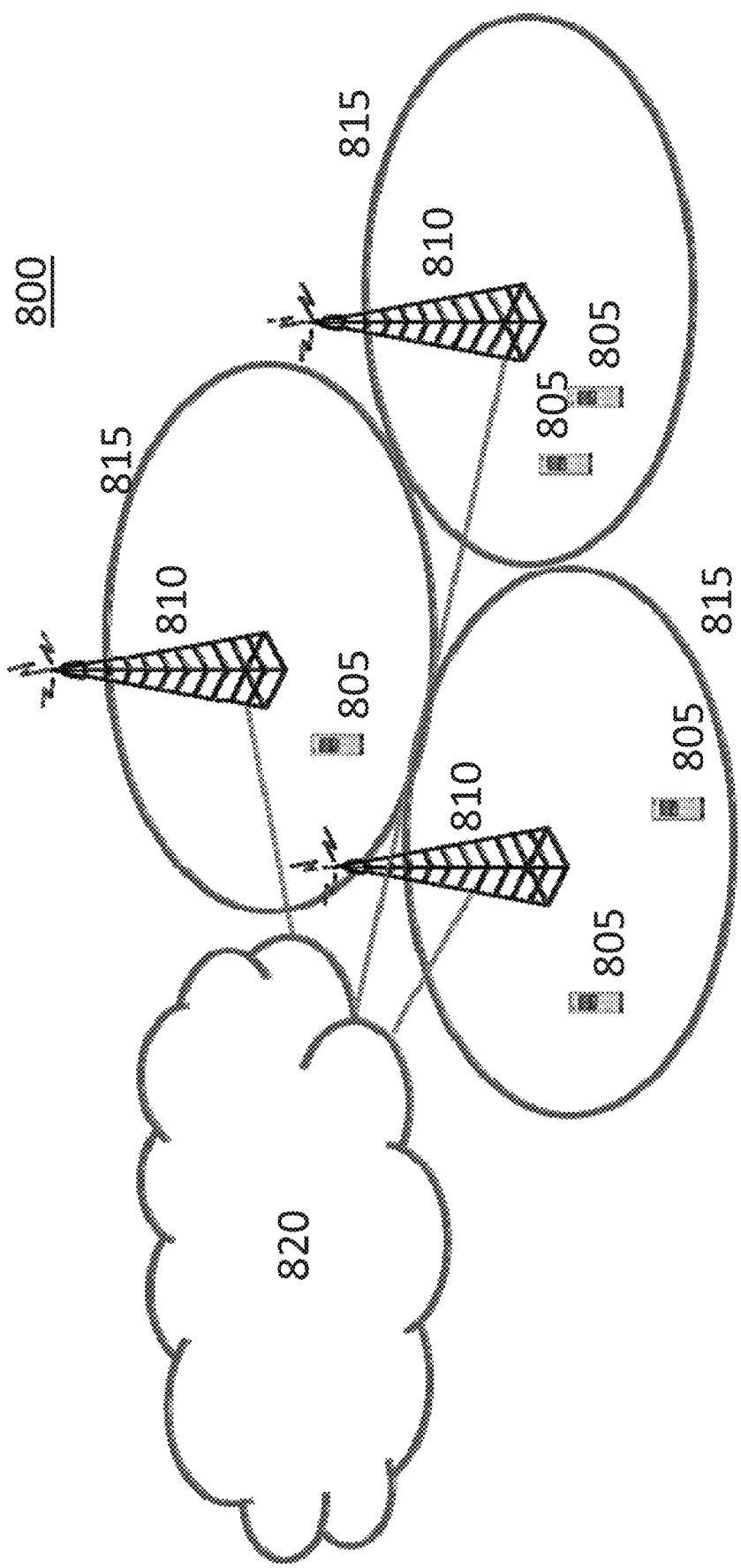
FIG. 8 illustrates a wireless network in accordance with an embodiment of the disclosed subject matter.

Referring to FIG. 8, a communication network 800 comprises a plurality of wireless communication devices 805 (e.g., conventional UEs, machine type communication [MTC]/machine-to-machine [M2M] UEs) and a plurality of radio access nodes 810 (e.g., eNodeBs or other base stations). Communication network 800 is organized into cells 815, which are connected to a core network 820 via corresponding radio access nodes 810. Radio access nodes 810 are capable of communicating with wireless communication devices 805 along with any additional elements suitable to support communication between wireless communication devices or between a wireless communication device and another communication device (such as a landline telephone).

Figure 9:
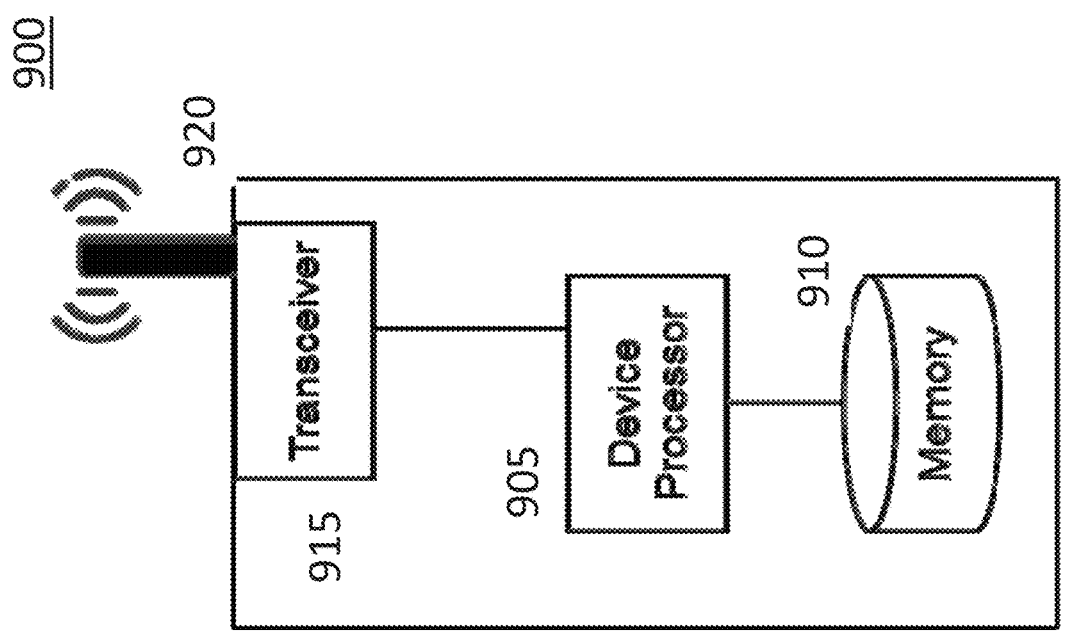
FIG. 9 illustrates a wireless communication device in accordance with an embodiment of the disclosed subject matter.

Although wireless communication devices 805 may represent communication devices that include any suitable combination of hardware and/or software, these wireless communication devices may, in certain embodiments, represent devices such as an example wireless communication device illustrated in greater detail by FIG. 9. Similarly, although the illustrated radio access node may represent network nodes that include any suitable combination of hardware and/or software, these nodes may, in particular embodiments, represent devices such as the example radio access node illustrated in greater detail by FIG. 10.

Referring to FIG. 9, a wireless communication device 900 comprises a processor 905, a memory, a transceiver 915, and an antenna 920. In certain embodiments, some or all of the functionality described as being provided by UEs, MTC or M2M devices, and/or any other types of wireless communication devices may be provided by the device processor executing instructions stored on a computer-readable medium, such as the memory shown in FIG. 9. Alternative embodiments may include additional components beyond those shown in FIG. 9 that may be responsible for providing certain aspects of the device's functionality, including any of the functionality described herein.

Figure 10:
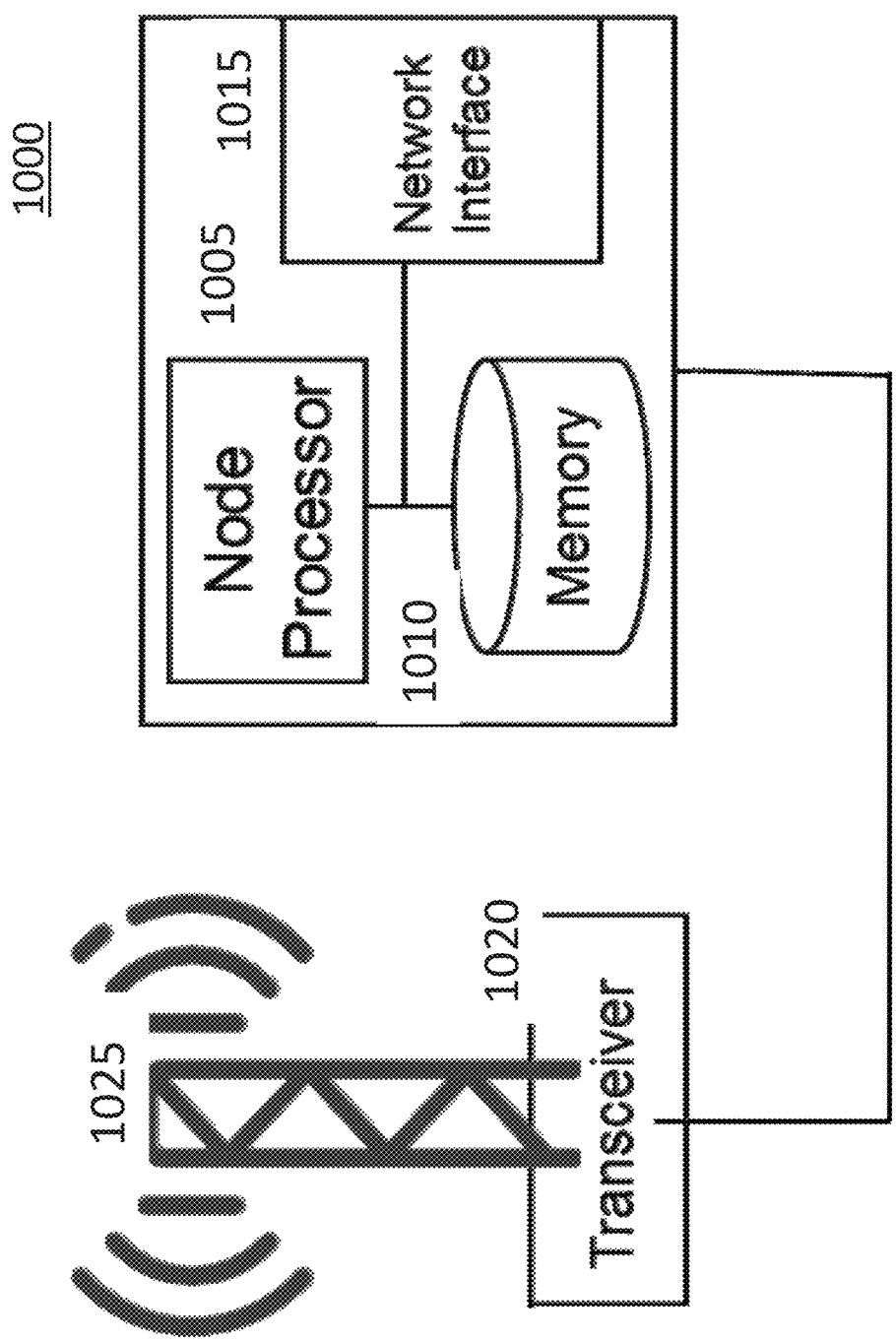
FIG. 10 illustrates a radio access node in accordance with an embodiment of the disclosed subject matter.

Referring to FIG. 10, a radio access node 1000 comprises a node processor 1005, a memory 1010, a network interface 1015, a transceiver 1020 and an antenna 1025. In certain embodiments, some or all of the functionality described as being provided by a base station, a NodeB, an eNodeB, and/or any other type of network node may be provided by node processor 1005 executing instructions stored on a computer-readable medium, such as memory 1010 shown in FIG. 10. Alternative embodiments of radio access node 1000 may comprise additional components to provide additional functionality, such as the functionality described herein and/or related supporting functionality.

Figure 11:
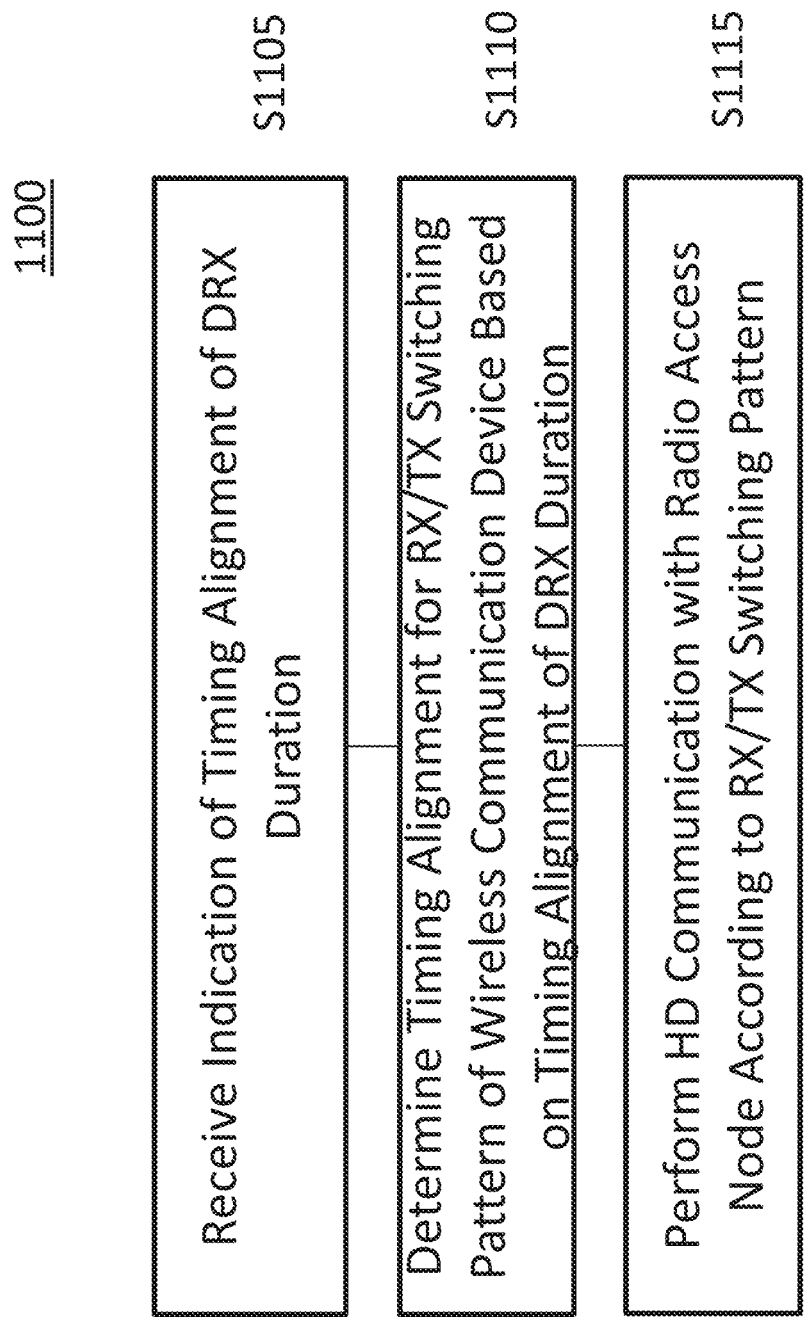
FIG. 11 is a flowchart illustrating a method of operating a wireless communication device according to an embodiment of the disclosed subject matter.

FIG. 11 is a flowchart illustrating a method 1100 of operating a wireless communication device according to an embodiment of the disclosed subject matter. The method of FIG. 11 could be performed by a wireless communication device such as that illustrated in FIG. 9, for instance.

Referring to FIG. 11, the method comprises receiving an indication of timing alignment of a DRX duration (S1105), determining a timing alignment for an RX/TX switching pattern of the wireless communication device based on the timing alignment of the DRX duration (S1110), and performing HD communication with a radio access node according to the RX/TX switching pattern having the determined timing alignment (S1115). A DRX duration generally refers to a time period in which a device is in a particular DRX mode. For instance, a DRX ON duration may refer to a period in which the wireless communication device is in a DRX ON mode. The timing alignment of the DRX duration may refer to a time point where a DRX duration starts or stops or another time point defined in relation to such a time point, for instance. Similarly, the timing alignment of the RX/TX switching pattern may refer to a time point where a state of the RX/TX switching pattern starts or stops or another time point defined in relation to such a time point, for instance.

In certain related embodiments, the indication of the timing alignment for the DRX duration comprises an indication of a start time of the DRX duration. In some such embodiments, the DRX duration is a DRX ON duration. In such embodiments, determining the timing alignment for the RX/TX switching pattern comprises identifying a start time for a state of the RX/TX switching pattern as having a predetermined offset relative to the start time of the DRX duration. In some such embodiments, the state of the RX/TX switching pattern comprises a receive state, a transmit state, or a transition state.

In certain related embodiments, the method further comprises receiving an indication during an RX window of the RX/TX switching pattern to extend the RX window. In some such embodiments, the indication is contained in a MAC CE indicating a number of subframes by which the RX window is to be extended. In some such embodiments, the indication is an LCID value in the MAC CE.

In certain related embodiments, the method further comprises receiving information identifying multiple candidate RX/TX switching patterns that may be used by the wireless communication device, selecting one of the multiple candidate RX/TX switching patterns as a preferred RX/TX switching pattern, and transmitting an indication of the preferred RX/TX switching pattern to the radio access node. The indication of the preferred RX/TX switching pattern could be, for instance, an LCID value included in a random access Msg3.

In certain related embodiments, the DRX duration is a DRX ON duration and the method further comprises determining whether the wireless communication device receives a PDCCH communication during the DRX ON duration, and in response to determining that the wireless communication device does not receive the PDCCH communication during the DRX ON duration, switching the wireless communication device to a DRX OFF state. In such embodiments, the method may still further comprise, in response to determining that the wireless communication device does not receive the PDCCH communication during the DRX ON duration, further determining whether the wireless communication device is engaged in an ongoing downlink or uplink transmission, and in response to determining that the wireless communication device is engaged in an ongoing downlink or uplink transmission, extending an RX or TX window of the RX/TX switching pattern.

Figure 12:
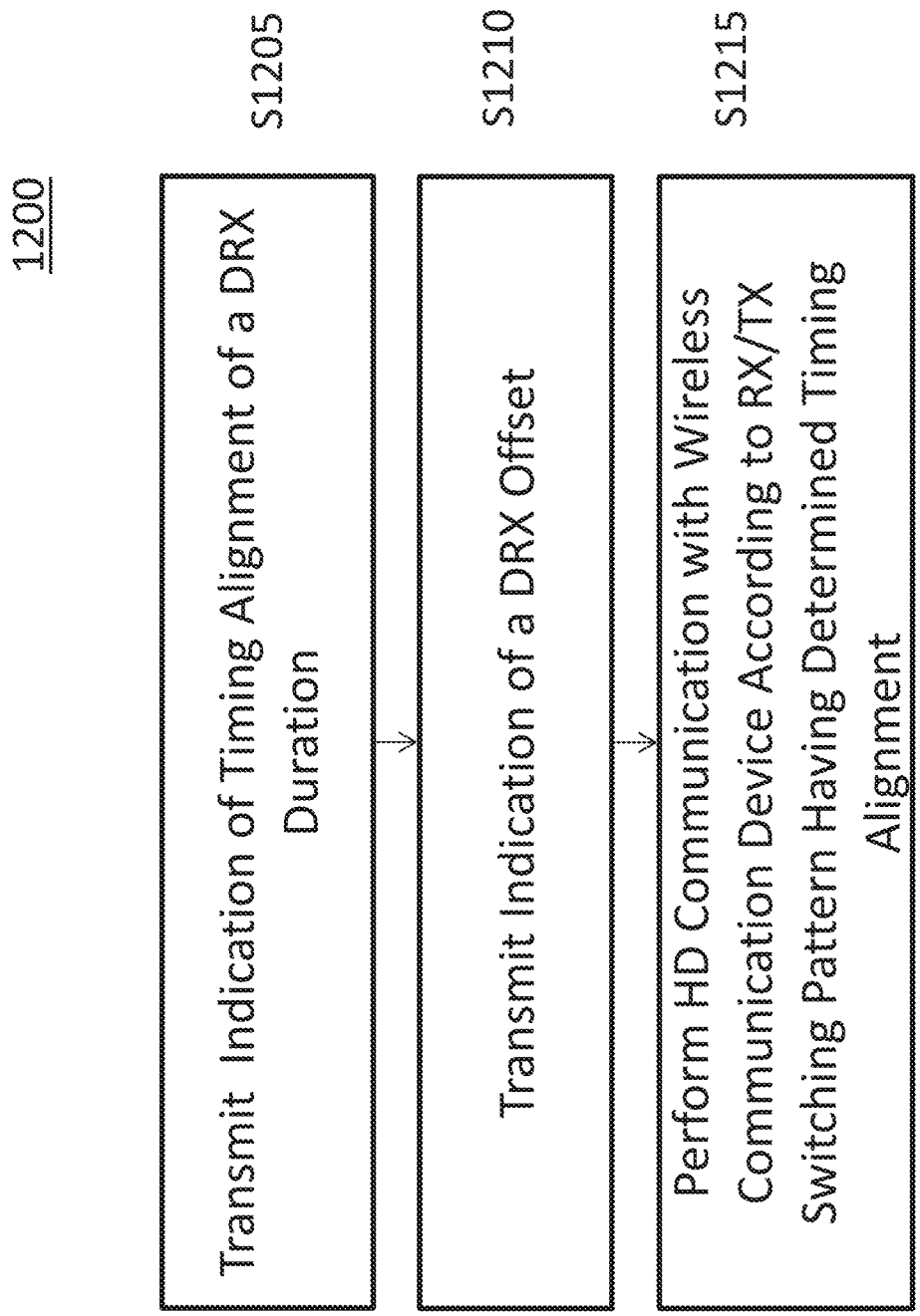
FIG. 12 is a flowchart illustrating a method of operating a radio access node according to an embodiment of the disclosed subject matter.

FIG. 12 is a flowchart illustrating a method 1200 of operating a radio access node according to an embodiment of the disclosed subject matter. The method of FIG. 12 could be performed by a radio access node such as that illustrated in FIG. 10, for instance.

Referring to FIG. 12, the method comprises transmitting an indication of timing alignment of a DRX duration (S1205), transmitting an indication of a DRX offset that, in combination with the timing alignment of the DRX duration, defines a timing alignment for a RX/TX switching pattern of a wireless communication device (1210), and performing HD communication with the wireless communication device according to the RX/TX switching pattern having the determined timing alignment (S1215).

In certain related embodiments, the indication of the timing alignment for the DRX duration comprises an indication of a start time of the DRX duration. In some such embodiments, the DRX duration is a DRX ON duration. In some such embodiments, the timing alignment for the RX/TX switching pattern comprises a start time for a state of the RX/TX switching pattern having a predetermined offset relative to the start time of the DRX duration, and wherein the state of the RX/TX switching pattern comprises a receive state, a transmit state, or a transition state.

In certain related embodiments, the method further comprises transmitting an indication during an RX window of the RX/TX switching pattern to extend the RX window. In some such embodiments, the indication is contained in a MAC CE indicating a number of subframes by which the RX window is to be extended. The indication can be e.g. an LCD value in the MAC CE.

In certain related embodiments, the method further comprises transmitting information identifying multiple candidate RX/TX switching patterns that may be used by the wireless communication device, and receiving from the wireless communication device an indication of one of the multiple candidate RX/TX switching patterns as a preferred RX/TX switching pattern. In some such embodiments, the indication of the preferred RX/TX switching pattern is an LCID value included in a random access Msg3.

In certain related embodiments, the method further comprises detecting an unsuccessful reception of the packet containing the MAC CE with RX window extension by the UE, by monitoring UE's UL transmission (i.e. PUCCH) in the default UL transmission window. In this scenario, the radio access network stops transmitting the packets to the UE until the next default DL transmission opportunity.

Figure 13:
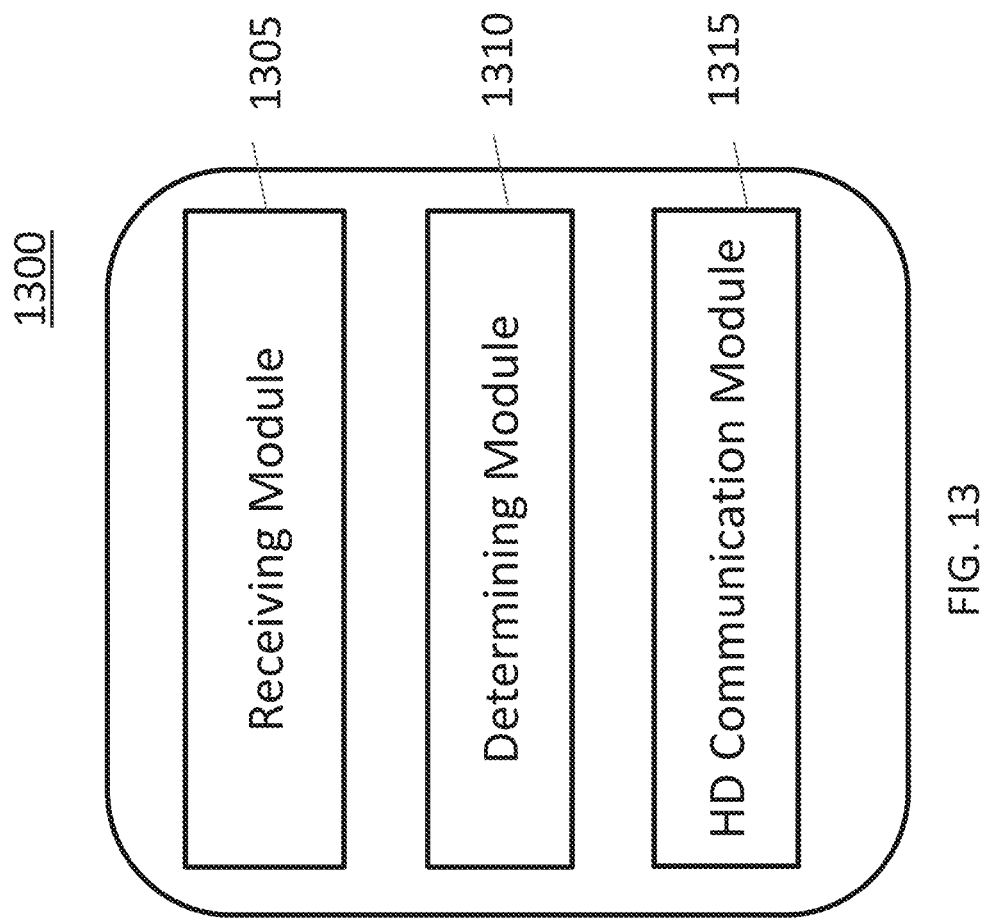
FIG. 13 illustrates a wireless communication device according to an embodiment of the disclosed subject matter.

FIG. 13 illustrates a wireless communication device 1300 according to an embodiment of the disclosed subject matter.

Referring to FIG. 13, wireless communication device 1300 comprises a receiving module 1305 configured to receive an indication of timing alignment of a DRX duration, a determining module 1310 configured to determine a timing alignment for an RX/TX switching pattern of the wireless communication device based on the timing alignment of the DRX duration, and an HD communication module 1315 configured to perform HD communication with a radio access node according to the RX/TX switching pattern having the determined timing alignment.

In certain related embodiments, the indication of the timing alignment for the DRX duration comprises an indication of a start time of the DRX duration. The DRX duration may be e.g. a DRX ON duration. The determining the timing alignment for the RX/TX switching pattern may comprise e.g. identifying a start time for a state of the RX/TX switching pattern as having a predetermined offset relative to the start time of the DRX duration. The state of the RX/TX switching pattern may comprise e.g. a receive state, a transmit state, or a transition state.

In certain related embodiments, the wireless communication device further comprises a second receiving module configured to receive an indication during an RX window of the RX/TX switching pattern to extend the RX window. The indication may be contained in e.g. a MAC CE indicating a number of subframes by which the RX window is to be extended. The indication may be e.g. an LCID value in the MAC CE.

In certain related embodiments, the wireless communication device further comprises a second receiving module configured to receive information identifying multiple candidate RX/TX switching patterns that may be used by the wireless communication device, a selecting module configured to select one of the multiple candidate RX/TX switching patterns as a preferred RX/TX switching pattern, and a transmission module configured to transmit an indication of the preferred RX/TX switching pattern to the radio access node. The indication of the preferred RX/TX switching pattern may be e.g. an LCD value included in a random access message 3 (Msg3).

In certain related embodiments, the DRX duration is a DRX ON duration and the wireless communication device further comprises a second determining module configured to determine whether the wireless communication device receives a physical downlink control channel (PDCCH) communication during the DRX ON duration, and a switching module configured to, in response to determining that the wireless communication device does not receive the PDCCH communication during the DRX ON duration, switch the wireless communication device to a DRX OFF state. In some such embodiments, the wireless communication device may further comprise a second determining module configured to, in response to determining that the wireless communication device does not receive the PDCCH communication during the DRX ON duration, further determine whether the wireless communication device is engaged in an ongoing downlink or uplink transmission, and an extending module configured to, in response to determining that the wireless communication device is engaged in an ongoing downlink or uplink transmission, extend an RX or TX window of the RX/TX switching pattern.

FIG. 14 illustrates a radio access node 1400 according to an embodiment of the disclosed subject matter.

Referring to FIG. 14, radio access node 1400 comprises a first transmission module 1405 configured to transmit an indication of timing alignment of a DRX duration, a second transmission module 1410 configured to transmit an indication of a DRX offset that, in combination with the timing alignment of the DRX duration, defines a timing alignment for a reception/transmission (RX/TX) switching pattern of a wireless communication device, and an HD communication module 1415 configured to perform HD communication with the wireless communication device according to the RX/TX switching pattern having the determined timing alignment.

In certain related embodiments, the indication of the timing alignment for the DRX duration comprises an indication of a start time of the DRX duration. The DRX duration may be e.g. a DRX ON duration. The timing alignment for the RX/TX switching pattern may comprise e.g. a start time for a state of the RX/TX switching pattern having a predetermined offset relative to the start time of the DRX duration, and wherein the state of the RX/TX switching pattern comprises a receive state, a transmit state, or a transition state.

In certain related embodiments, radio access node 1400 further comprises a third transmission module configured to transmit an indication during an RX window of the RX/TX switching pattern to extend the RX window. The indication may be contained in e.g. a MAC CE indicating a number of subframes by which the RX window is to be extended. The indication may be e.g. an LCD value in the MAC CE. The radio access node may further comprise a detection module configured to detect unsuccessful reception of a packet containing the MAC CE with an RX window extension at the UE, by monitoring UL transmission by the UE in a default UL transmission window, and a transmission stopping module configured to, in response to detecting the unsuccessful reception of the packet, stop transmission of packets to the UE until a next default DL transmission opportunity.

In certain related embodiments, the radio access node further comprises a third transmission module configured to transmit information identifying multiple candidate RX/TX switching patterns that may be used by the wireless communication device, and a receiving module configured to receive from the wireless communication device an indication of one of the multiple candidate RX/TX switching patterns as a preferred RX/TX switching pattern. The indication of the preferred RX/TX switching pattern may be e.g. an LCD value included in a random access message 3 (Msg3).

While the disclosed subject matter has been presented above with reference to various embodiments, it will be understood that various changes in form and details may be made to the described embodiments without departing from the overall scope of the disclosed subject matter.

The invention claimed is:

1. A method of operating a wireless communication device, the method comprising:
   receiving an indication of timing alignment of a discontinuous reception (DRX) duration from a network to which the wireless communication device is connected;
   determining a timing alignment for a reception/transmission (RX/TX) switching pattern of the wireless communication device based on the timing alignment of the DRX duration, wherein the DRX duration is a DRX ON duration, and wherein a start time of an RX state of the RX/TX switching pattern is aligned with respect to a fixed time offset from a start time of the DRX ON duration;
   performing half-duplex (HD) communication with a radio access node in the network according to the RX/TX switching pattern having the determined timing alignment; and
   receiving, from the network, an indication during an RX window of the RX/TX switching pattern to extend the RX window, wherein the indication received during the RX window is included in a medium access control (MAC) control element (CE) indicating a number of subframes by which the RX window is to be extended.

2. The method of claim 1, wherein the indication of the timing alignment for the DRX duration comprises an indication of the start time of the DRX duration.

3. The method of claim 2, wherein the indication received during the RX window is a logical channel identifier (LCID) value in the MAC CE.

4. The method of claim 1, further comprising:
   receiving information identifying multiple candidate RX/TX switching patterns that may be used by the wireless communication device;
   selecting one of the multiple candidate RX/TX switching patterns as a preferred RX/TX switching pattern; and
   transmitting an indication of the preferred RX/TX switching pattern to the radio access node.

5. The method of claim 4, wherein the indication of the preferred RX/TX switching pattern is a logical channel identifier (LCID) value included in a random access message 3 (Msg3).

6. The method of claim 1, wherein the method further comprises:
   determining whether the wireless communication device receives a physical downlink control channel (PDCCH) communication during the DRX ON duration; and
   in response to determining that the wireless communication device does not receive the PDCCH communication during the DRX ON duration, switching the wireless communication device to a DRX OFF state.

7. The method of claim 6, further comprising:
   in response to determining that the wireless communication device does not receive the PDCCH communication during the DRX ON duration, further determining whether the wireless communication device is engaged in an ongoing downlink or uplink transmission; and
   in response to determining that the wireless communication device is engaged in the ongoing downlink or uplink transmission, extending an RX or TX window of the RX/TX switching pattern.

8. A method of operating a radio access node, the method comprising:
   transmitting an indication of timing alignment of a discontinuous reception (DRX) duration in a network that comprises the radio access node;
   transmitting an indication of a DRX offset that, in combination with the timing alignment of the DRX duration, defines a timing alignment for a reception/transmission (RX/TX) switching pattern of a wireless communication device connected to the network, wherein the DRX duration is a DRX ON duration, and wherein a start time of an RX state of the RX/TX switching pattern is aligned with respect to a fixed time offset from a start time of the DRX ON duration;
   performing half-duplex (HD) communication with the wireless communication device according to the RX/TX switching pattern having the defined timing alignment; and
   transmitting an indication during an RX window of the RX/TX switching pattern to extend the RX window, wherein the indication transmitted during the RX window is included in a medium access control (MAC) control element (CE) indicating a number of subframes by which the RX window is to be extended.

9. The method of claim 8, wherein the indication of the timing alignment for the DRX duration comprises an indication of the start time of the DRX duration.

10. The method of claim 8, wherein the indication transmitted during the RX window is a logical channel identifier (LCID) value in the MAC CE.

11. The method of claim 8, further comprising:
    detecting unsuccessful reception of a packet containing the MAC CE with an RX window extension at the wireless communication device, by monitoring uplink (UL) transmission by the wireless communication device in a default UL transmission window; and in response to detecting the unsuccessful reception of the packet, stopping transmission of packets to the wireless communication device until a next default downlink (DL) transmission opportunity.

12. The method of claim 8, further comprising:

transmitting information identifying multiple candidate RX/TX switching patterns that may be used by the wireless communication device; and receiving, from the wireless communication device, an indication of one of the multiple candidate RX/TX switching patterns as a preferred RX/TX switching pattern.

13. The method of claim 12, wherein the indication of the preferred RX/TX switching pattern is a logical channel identifier (LCID) value included in a random access message 3 (Msg3).

14. A wireless communication device, comprising:

a receiver configured to receive an indication of timing alignment of a discontinuous reception (DRX) duration from a network to which the wireless communication device is connected; and at least one processor configured to determine a timing alignment for a reception/transmission (RX/TX) switching pattern of the wireless communication device based on the timing alignment of the DRX duration, and further configured to control half-duplex (HD) communication with a radio access node in the network according to the RX/TX switching pattern having the determined timing alignment, wherein the DRX duration is a DRX ON duration, and wherein a start time of an RX state of the RX/TX switching pattern is aligned with respect to a fixed time offset from a start time of the DRX ON duration, wherein the receiver is further configured to receive an indication during an RX window of the RX/TX switching pattern to extend the RX window, and wherein the indication received during the RX window is included in a medium access control (MAC) control element (CE) indicating a number of subframes by which the RX window is to be extended.

15. The wireless communication device of claim 14, wherein the indication of the timing alignment for the DRX duration comprises an indication of the start time of the DRX duration.

16. The wireless communication device of claim 14, wherein the indication received during the RX window is a logical channel identifier (LCID) value in the MAC CE.

* * * * *